United States Patent [19]
Doany et al.

[11] Patent Number: 6,019,474
[45] Date of Patent: Feb. 1, 2000

[54] MODIFIED X-CUBE ARRANGEMENT FOR IMPROVED CONTRAST PROJECTION DISPLAY

[75] Inventors: Fuad Elias Doany, Katonah; Derek Brian Dove, Mount Kisco, both of N.Y.

[73] Assignee: International Business Machines Corporation, Armonk, N.Y.

[21] Appl. No.: 09/167,156

[22] Filed: Oct. 6, 1998

[51] Int. Cl.[7] ............................ G02B 27/10; G03B 21/14
[52] U.S. Cl. ............................... 353/33; 353/81; 359/834
[58] Field of Search ..................................... 359/634, 638, 359/636, 833, 834, 835; 353/81, 33, 82, 30, 31, 38, 34, 20; 348/780, 757; 356/618, 629, 637

[56] References Cited

U.S. PATENT DOCUMENTS

| | | | |
|---|---|---|---|
| 1,843,007 | 1/1932 | Troland | 359/629 |
| 3,303,278 | 2/1967 | Beno et al. | 348/780 |
| 5,042,912 | 8/1991 | Sato et al. | 359/638 |
| 5,098,183 | 3/1992 | Sonehara | 353/33 |
| 5,237,435 | 8/1993 | Kurematsu | 359/41 |
| 5,321,499 | 6/1994 | Yu et al. | 348/757 |
| 5,738,426 | 4/1998 | Daijogo et al. | 353/31 |
| 5,743,610 | 4/1998 | Yajima et al. | 353/81 |
| 5,749,641 | 5/1998 | Brice et al. | 353/81 |
| 5,826,959 | 10/1998 | Atsuchi | 353/20 |

*Primary Examiner*—William C. Dowling
*Attorney, Agent, or Firm*—Scully, Scott, Murphy & Presser; David M. Shofi, Esq.

[57] ABSTRACT

An optical projection display system, such as a liquid crystal display device, is disclosed. A feature of the present invention is that the projection display system utilizes a modified X-cube (or X-prism) arrangement wherein the internal angles of the prisms forming the modified X-cube deviate from 90°. The utilization of the present modified X-cube arrangement improves contrast for checkerboard images, minimizes the possibility of spurious unwanted reflections from entering the projection lens as well as substantially eliminating glare and ghost images typically present using prior art X-cubes.

15 Claims, 10 Drawing Sheets

MODIFIED X-CUBE ARRANGEMENT FOR IMPROVED CONTRAST PROJECTION DISPLAY

FIELD OF THE INVENTION

The present invention relates to an optical system for projection displays and more particular to an optical system using a modified X-cube arrangement which substantially reduces the glare and ghost images typically caused when prior art X-cube arrangements are employed. Moreover, the modified X-cube (or X-prism) arrangement of the present invention reduces unwanted reflections and thus provides enhanced contrast imaging as compared with prior art X-cubes. The modified X-cube arrangement of the present invention is preferably employed in three color high resolution projection displays.

BACKGROUND OF THE INVENTION

Three color high resolution displays based on spatial light modulators (SLMs), require three SLMs to produce an image. Each SLM operates on one of the three colors: red (R), green (G) and blue (B). The resulting full color image is a superposition of the individual red, green and blue images on the screen. Liquid crystal (LC) light valves are one known type of SLM.

Figure 1:
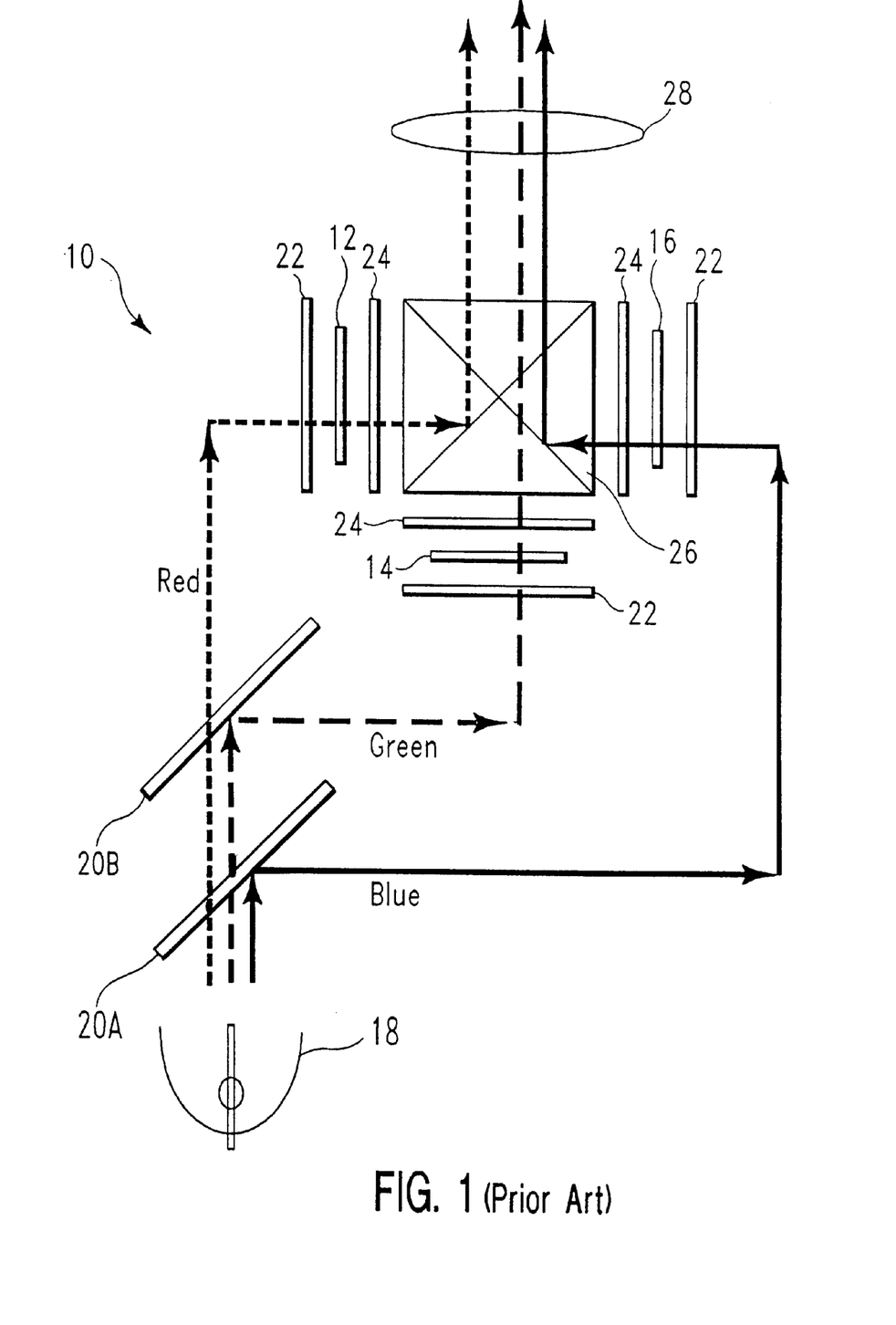
FIG. 1 is a schematic of a typical prior art optical projection system.

A typical prior art configuration for a three color scheme is shown in FIG. 1. Specifically, FIG. 1 shows a prior art configuration 10 which uses three transmission type light valves (or SLMs) 12, 14, 16; one for each color. The operating principle is based on rotation of polarization of incoming light for each pixel. An image is formed in a transmission liquid crystal light valve when the light valve is placed between polarizers. In a projection system, each of the three light valves controls the image formation of one of the three individual color components. The complete projection system typically uses a white lamp arc source 18 followed by dichroic color filters 20A and 20B which split the incoming white light into red (R), green (G) and blue (B) components. Each color component is directed to one of the three light valves. A polarizer 22 is placed at the input to each light valve to select only one polarization state to enter the light valve. A second polarizer 24 is placed after each of the three light valves to select the image forming light. An X-cube 26 is typically used to combine the images produced by the individual red, green and blue light valves to form the full composite image. A projection lens 28 completes the system to magnify and project the images onto a screen.

A number of projection systems using transmission light valves are commercially available. However, in order to prepare light valves with a higher number of pixels as required for high resolution displays, the liquid crystal panel becomes large. It is difficult to produce transmission light valves with very small pixels since the electronic circuitry needed for operation of the light valves obscures the light passage through the pixels to an intolerable degree. Instead, reflection based light valves are emerging for high resolution applications. In the reflection mode, it becomes possible to fabricate the mirror structure directly above the electronic circuitry. This mode allows smaller pixel area without obstructing the light passage caused by the electronic circuitry, thus allowing maximum light throughput.

Figure 2:
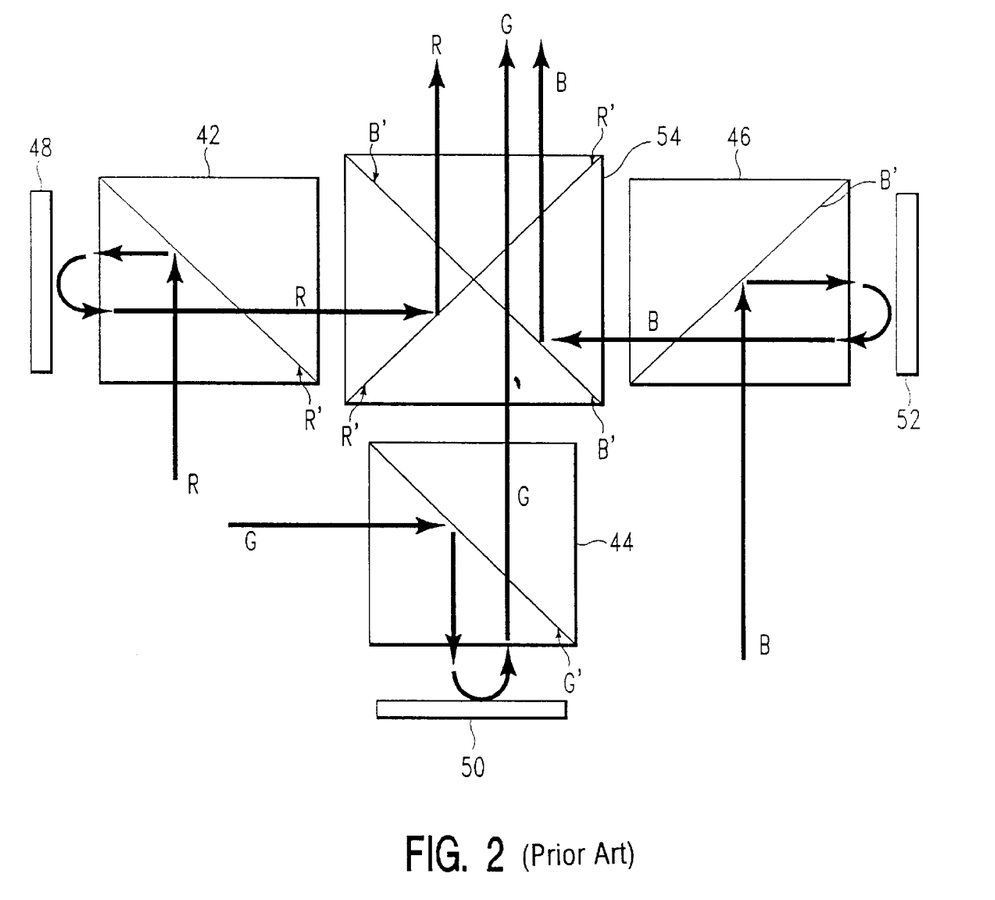
FIG. 2 an illustration of a prior art optical arrangement containing three light valves, three polarized beam splitters and a X-cube having 45° dichroic interfaces (internal angles are 90°).

The above described configuration as well as other projection displays employing reflective liquid crystal light valves utilize an optical arrangement similar to that shown in FIG. 2. Light from an illumination system (not shown) is divided into beams of red (R), green (G) and blue (B) by means of dichroic mirrors (also not shown in FIG. 2). Each colored beam is directed to its corresponding polarizing beam splitter (PBS) 42, 44 and 46 adjacent to a reflective light valve (LV) 48, 50 and 52. Illustratively, PBS 42 and LV 48 are selective for red light, PBS 44 and LV 50 are selective for green light and PBS 46 and LV 52 are selective for blue light. Each polarizing beam splitter directs a polarized beam onto its light valve which in its dark state typically acts similarly to a mirror. Moreover, each polarizing beam splitter contains a dichroic coating which is selective for reflecting a specific color of light. In FIG. 2, PBS 42 contains a dichroic coating specific for red (R'), PBS 44 contains a dichroic coating specific for green (G') and PBS 46 contains a dichroic coating specific for blue (B').

The incident light is reflected back into the polarizing beam splitter without change in polarization and is therefore reflected again at the PBS back toward the light source. If a voltage is applied across the liquid crystal layer there is a rotation in polarization and the reflected beam is transmitted by the polarizing beam splitter and enters a so called X-cube 54.

X-cube 54 consists of 4 right angle prisms to which dichroic coatings have been applied, cemented together to form a cube. The cube has the property that it contains two color specific reflecting planes within it by careful alignment of the four prisms from which it is constructed. Typically one coating will reflect only red (R) and the other only blue (B). Green (G) light in this case would be transmitted by both. In the drawings, the dichroic coating selective for red is labeled (R') whereas the dichroic coating selective for blue is labeled (B'). In practice, however, the dichroic coatings may not be perfect, that is the blue (B) coating may actually reflect a small amount of red (R) light and this can give rise to unexpected and unwanted additional light paths within the prism.

Red (R) light entering the X-cube is reflected by a red reflecting dichroic coating (R') into a projection lens not shown. Similarly a beam of another color, for example blue, entering its appropriate face of the X-cube is reflected into a common beam entering the projection lens. That is, the X-cube acts as a color combining element that redirects red, green and blue light from the three modulating light valves into a common beam that enters the projection lens for imaging on a distant screen.

Figure 3A:
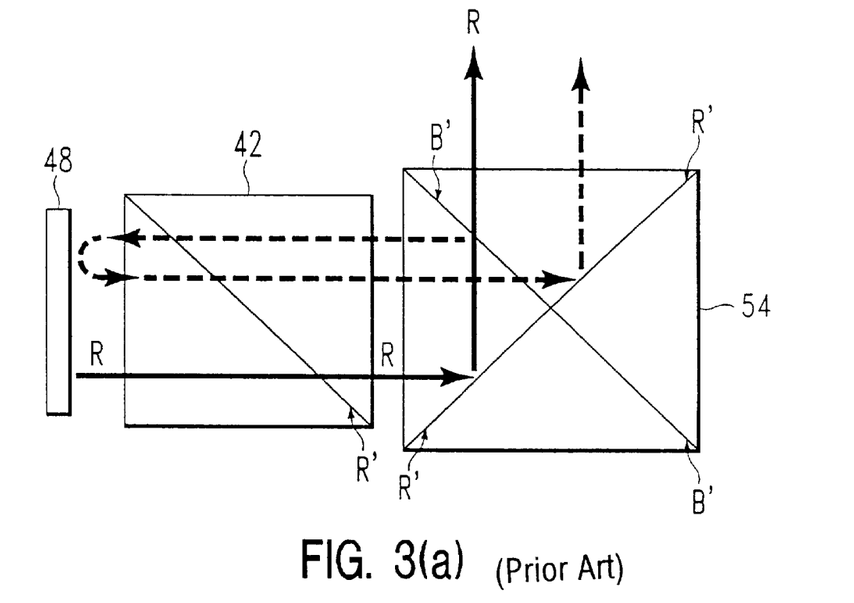
FIGS. 3(a)–(b) are illustrations showing the stray light (dashed lines) produced by partial reflections from 45° dichroic coatings of a prior art X-cube for side channels-red light.
Figure 3B:
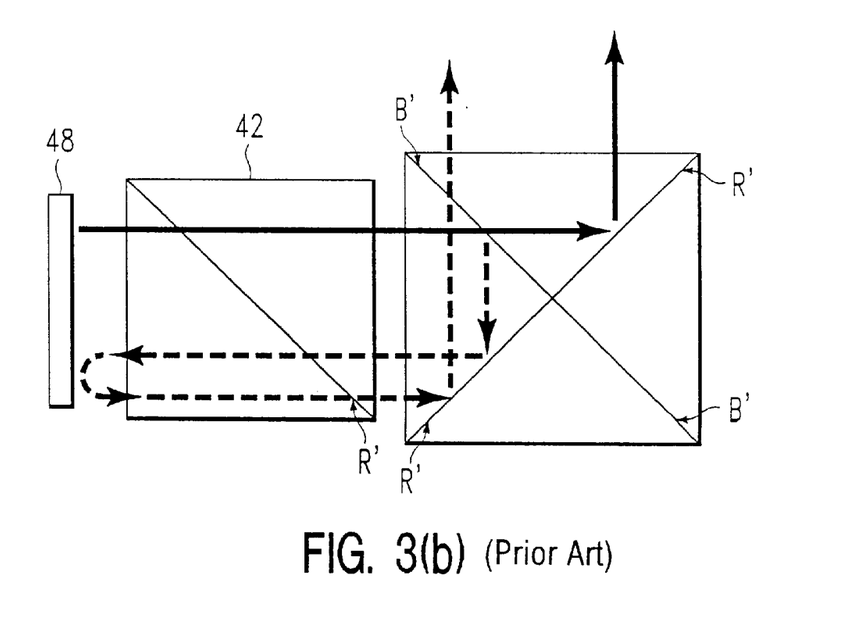

A major problem with prior art X-cubes of the type shown in FIG. 2 is the unwanted reflections which occur between the various dichroic coatings on the cube. This problem is illustrated in FIGS. 3(a)–(b). Specifically, light from a red cell has to traverse a blue reflecting coating (B') to meet the red reflecting coating (R') that directs the beam to the projection lens. A small amount of red light indicated by the dashed line, is reflected by the blue coating (B') as shown, toward the red reflecting coating (R') where it is redirected to light valve 48 and subsequently gives rise to a new unwanted beam (dashed line) that can reach the projection lens.

Even a small amount of light reflected in this way can give rise to an unfocused background illumination that raises the light level in otherwise dark regions appreciably reducing contrast. A similar effect can occur in other channels as shown for the straight through channel in FIG. 4. The above-mentioned effect can play an important part in lowering the image contrast as measured by comparing the light produced from a bright region on the light valve to the light produced from a dark region on the light valve. These bright and dark regions are produced by electronically driving regions of the light valve completely on while other regions of the light valve are driven completely off. Specifically, a much lower contrast is observed when the light valves are turned on in a checkerboard fashion as in the American National Standards for Audiovisual Systems (ANSI) contrast measurement, since in this case light from the bright portions of the checkerboard can reach dark regions by means of spurious reflections.

Figure 4:
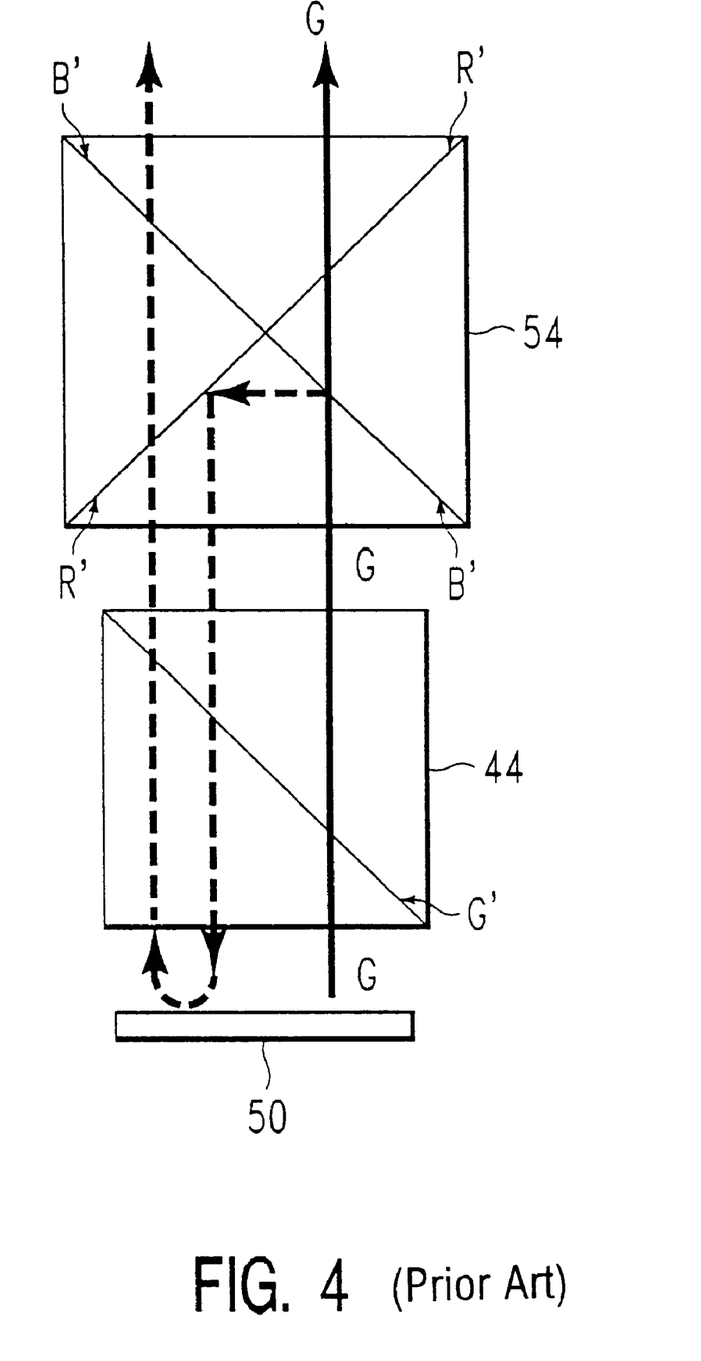
FIG. 4 is illustration showing the stray light (dashed lines) produced by partial reflections from 45° dichroic coatings of a prior art X-cube for straight through channel-green light.

FIGS. 3(a)–(b) and 4 show that light which is in a direction normal to the light valve results in the spurious reflections. In an actual optical projection system, a cone of light is incident onto the light valve. This case also leads to the same spurious reflections. Since the internal angles of the X-cube are at 90°, any light with a principal entry ray incident to an internal X-cube surface at approximately 45° (e.g. 45±10°) will also be reflected along its original direction back to the light valve (45° reference orientation). This is a result of the 90° corner cube effect produced by the two internal interfaces. As is well known in the art, two reflecting surfaces aligned at 90° will always send light back along its original direction. Thus, all light within a specific cone angle will be retro-reflected also within the same cone angle. This leads to the same spurious reflections depicted in FIGS. 3(a)–(b) and 4 within the entire light cone angle.

In view of the drawbacks mentioned above with prior art projection displays there is a continued need to develop a new and improved optical projection system which provides superior resolution and enhanced contrast imaging.

SUMMARY OF THE INVENTION

One object of the present invention is to provide an optical system for projection displays that eliminates the problems described hereinabove regarding prior art optical systems.

Another object of the present invention is to provide an optical arrangement which substantially eliminates glare, ghost images and reflection of unwanted light and produces a common light source that can easily be projected onto a projection screen.

A yet further object of the present invention is to provide an efficient and cost effective high resolution optical display.

A still further object of the present invention is to provide a modified X-cube arrangement which avoids ghost images, improves contrast for a checkerboard image and minimizes unwanted spurious rays from entering the projection lens.

These and other objects and advantages can be achieved in the present invention by employing a modified X-cube (or X-prism) which comprises four prisms. Each prism has two surfaces adjacent its base, each of which is coated with a different dichroic coating. The surfaces form an angle opposite its base which is other than 90°. The prisms are arranged in a manner such that surfaces with like dichroic coatings form two intersecting color specific planes within the X-prism. Unlike prior art X-cubes, the reflecting planes of the X-prism of the present invention are titled so that, optimally, the principal entry ray incident to an internal X-prism surface forms an angle other than 45° with the surface. The planes are titled so that the principal entry ray is incident ±3° from 45° with the first plane. This tilt is sufficient to cause unwanted spurious rays to be removed from the common source. Moreover, the spurious rays are substantially deviated from the path of the common beam and are well outside the area required by the projection lens to cause projection of the same.

Such a X-prism results in the elimination of glare and ghost images normally associated with prior art X-cubes by reflecting the stray red, blue and green light away from the path of light transmitted to the projection lens and therefore the projection screen. This has the effect that the so called corner cube reflector effect of prior art X-cubes is avoided. Stated differently, multiply reflected rays of the unwanted type shown in FIGS. 3(a)–(b) and 4, are deviated successively utilizing the inventive X-prism by a few degrees at each reflection.

This deviation, although being minor, is sufficient to ensure that the spurious beam is deviated significantly from the normal desired beam, and the same is thus not collected by the projection lens. Since the illumination actually provides a cone of rays incident upon each light valve it is important that the net deviation of the spurious rays exceeds twice the cone angle of the rays.

DETAILED DESCRIPTION OF THE INVENTION

The present invention which provides an optical arrangement for use in projection displays will now be described in greater detail by referring to the drawings that accompany this application.

Figure 5:
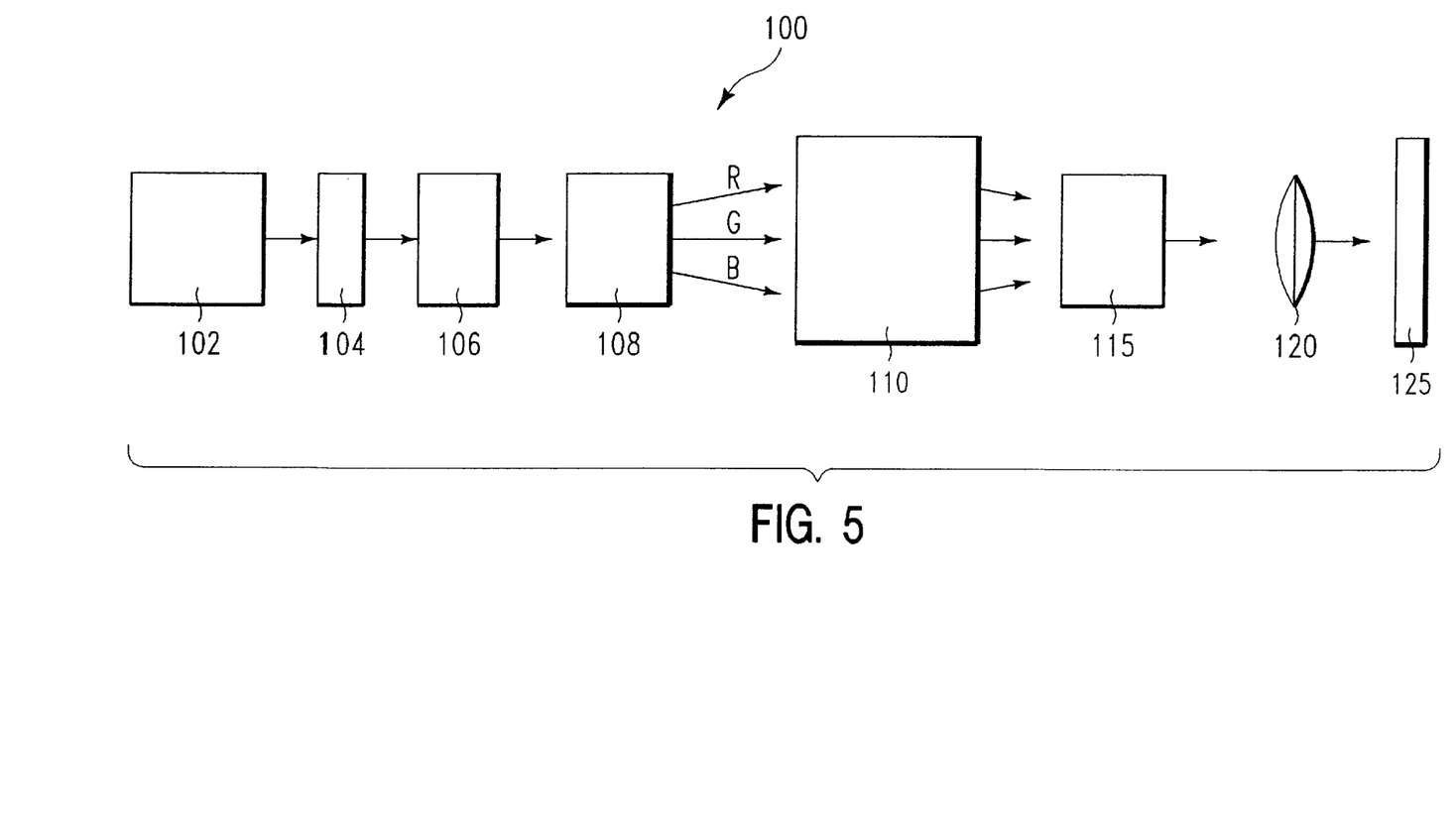
FIG. 5 is a schematic of an optical projection system according to the present invention.

Reference is made to FIG. 5 which is a schematic of an optical projection system 100 which includes the inventive X-prism of the present invention. It is noted that the optical projection system shown in FIG. 1 can also be employed in the present invention. The optical projection system illustrated in FIG. 5 includes a lamp source 102 such as an arc lamp which is capable of emitting light of various wavelengths. The lamp output is first filtered by using a filter 104 which is capable of removing ultra-violet and/or infra-red radiation. The optical projection system also includes illumination optics 106 which receives the light from the lamp source and produces a uniform intensity distribution.

Illustratively, the illumination optics includes a fly's eye lens array to produce the uniform light intensity. The illumination optics may also include optical components to convert most of the unpolarized light into one polarization.

Color splitting optics 108 receive light from illumination optics 106. The color splitting optics include dichroic mirrors which reflect one color of light while transmitting the other colors resulting in the separation of the three colors of light (red, green and blue) to light valve optical arrangement 110. Light valve optical arrangement 110 includes three polarizing beam splitters and three light valves. For simplicity, those elements are not shown in FIG. 5. The polarizing beam splitters reflect the polarized illumination light to each of the three light valves. Each of the three polarizing beam splitters contain an optical coatingoptimized to operate at a specific color, e.g. red, green or blue.

The image forming light is reflected by the light valve with rotated polarization. The image forming light is then transmitted by the polarizing beam splitters and the three colors, red, green and blue, emerge from the light valve optical arrangement. The three colors are then directed to modified X-cube (or X-prism) 115 which serves to recombine the individual colors into a common beam. The inventive X-prism will be described in greater detail herein below.

The optical system of the present invention further includes a projection lens 120 for receiving the common beam from the inventive X-prism 115 and for imaging the same on a projection screen 125.

It should be noted that although the drawings show a specific optical projection system the present invention is not limited thereto. Instead, the present invention, i.e. modified X-cube, can be utilized in any other type of optical projection system which is capable of generating red, green and blue light.

Figure 7:
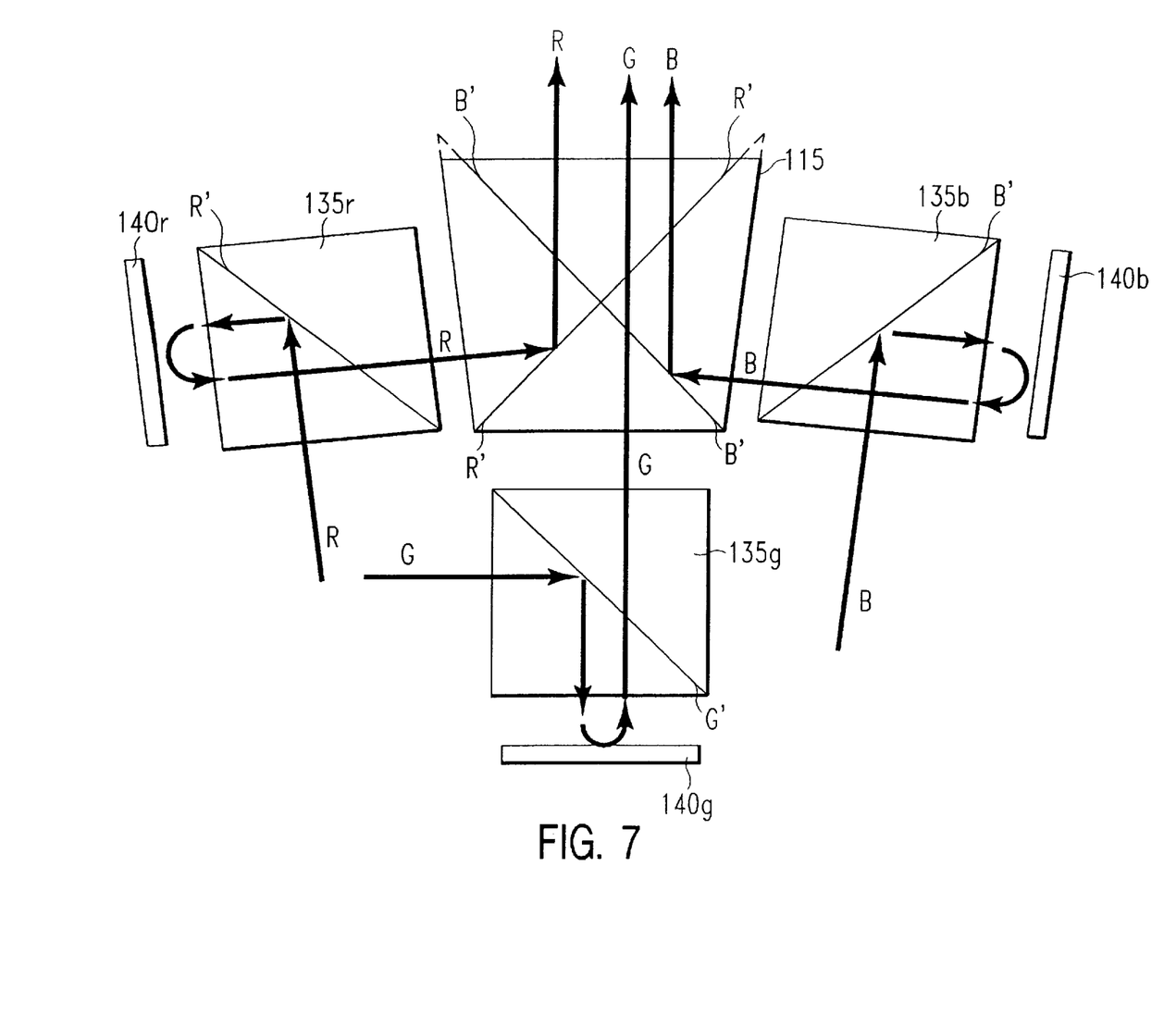
FIG. 7 is an illustration of an optical arrangement using the X-prism shown in FIG. 6 in the optical system of FIG. 5.

Turning to the modified X-cube of the present invention, attention is directed to FIG. 7 which is an illustration of an optical arrangement that includes the modified X-cube of the present invention in proximity to a specific light valve optical arrangement which includes three light valves and three polarizing beam splitters. Specifically, the optical arrangement shown in FIG. 7 comprises three polarizing beam splitter cubes 135r, 135b and 135g each optimized for operation at a specific color of light (red, blue or green). Each beam splitter contains a specific dichroic coating, R', B' and G' which reflects one polarization and transmits the other. In close proximity and adjacent to each, is a light valve 140r, 140b and 140g. Each light valve is preferably a reflective liquid crystal (LC) spatial light modulator (SLM). Alternatively, the light valves can be a transmission SLM or another type of reflective SLM such as a digital mirror device (DMD).

The optical arrangement of FIG. 7 further includes modified X-cube (or X-prism) 115 which is capable of recombining the three colors transmitted through the polarizing beam splitters into a common beam which is then redirected to the projection lens. In accordance with the present invention, the X-prism comprises four prisms, each prism having two surfaces opposite its base which are coated with different color separating dichroic materials. The surface (side) of the X-prism through which the light is emitted is shown to be straight such that the corners of the left and right prisms are cut-off for practical purposes. Alternatively, the corners can remain as shown by the dotted lines in FIGS. 6–10 such that all four prisms are triangularly-shaped. The four prisms are arranged in a desired configuration so that similar coatings form a continuous line within the X-prism and then they are cemented together. This results in the formation of two reflecting planes within the X-prism itself. The X-prism of the present invention is unlike prior art X-cubes in that the internal angles between the dichroic surfaces, i.e. angles opposite the base of each prism, are angles other than 90°. The specific choice of the internal angles of the X-prism may vary depending upon the specific light of interest. Preferred angles for the internal angles of the four prisms forming the X-prism are 84° or 96°.

Figure 6:
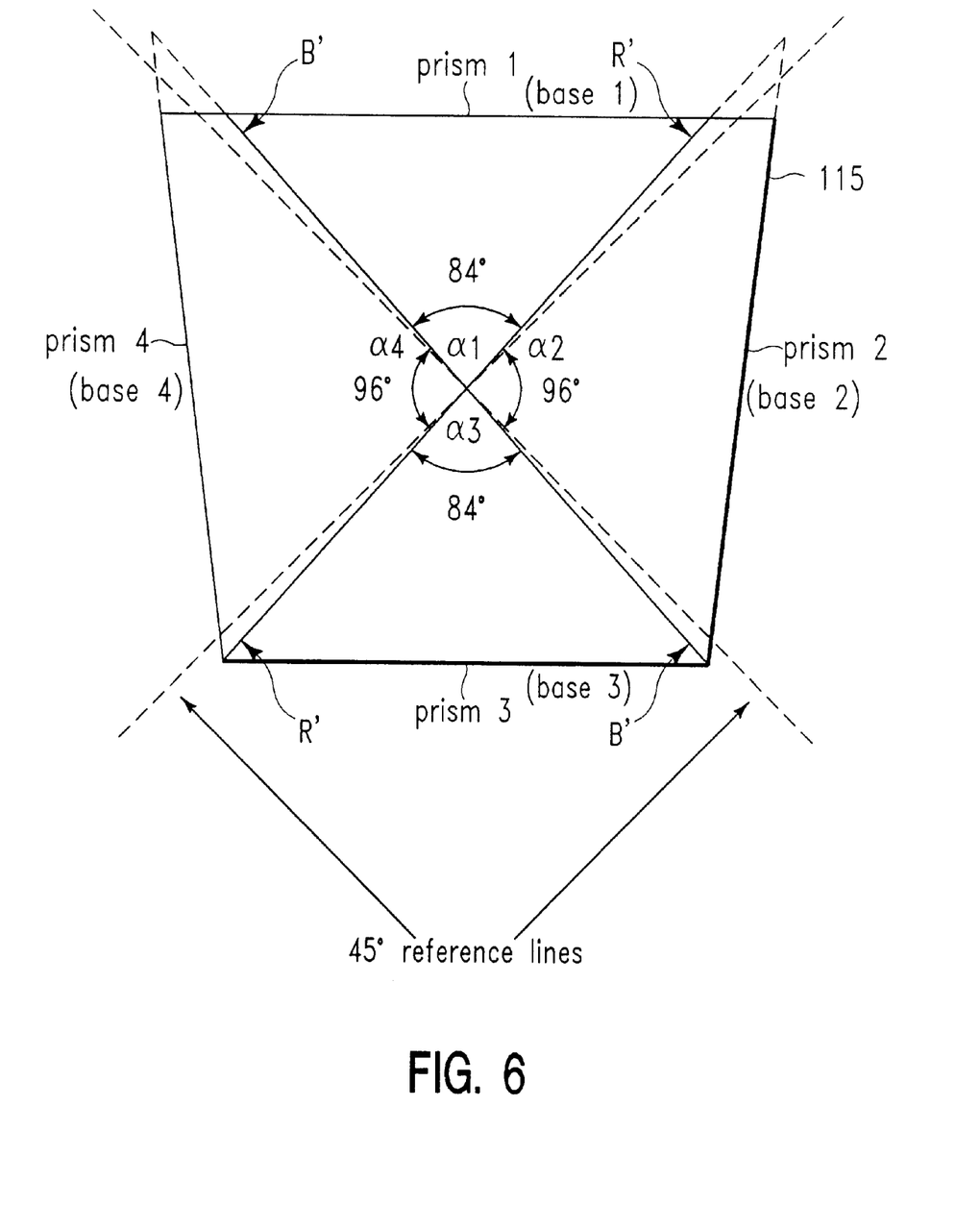
FIG. 6 is an illustration showing one possible orientation of the inventive X-prism that can be used in the optical projection system shown in FIG. 5.

An example of a typical X-prism configuration that can be utilized in the present invention is shown in FIG. 6. Specifically, as is shown therein, each dichroic surface is tilted by 3° from the original 45° orientation whereas the side faces of the prism are tilted by 6° so that the principal entry rays from the light valves are normal to the surfaces shown in FIG. 7. Specifically, the X-prism shown in FIG. 6 comprises prism 1 having internal angle, $\alpha_1$, of about 84°, prism 2 having an internal angle, $\alpha_2$ of 96°, prism 3 having an internal angle, $\alpha_3$ of 84°, and prism 4 having an internal angle, $\alpha_2$ of 96°. For reference, FIG. 6 contains the normal 45° reference lines.

By implementing the use of the inventive X-prism configuration, the corner cube effect of the prior art X-cubes mentioned hereinabove is avoided. That is, the multiply reflected rays of the unwanted type as shown in FIGS. 3(a)–(b) and 4 are deviated successively by a few degrees at each reflection, sufficient to ensure that the unwanted beams are deviated significantly from the common beam. This causes the unwanted beams to be outside the path of common beam and hence they are not projected onto the projection screen.

Since the illumination provides a cone of rays incident upon each light valve, it is important that the net deviation of the unwanted rays exceeds twice the cone angle of the rays.

Figure 8:
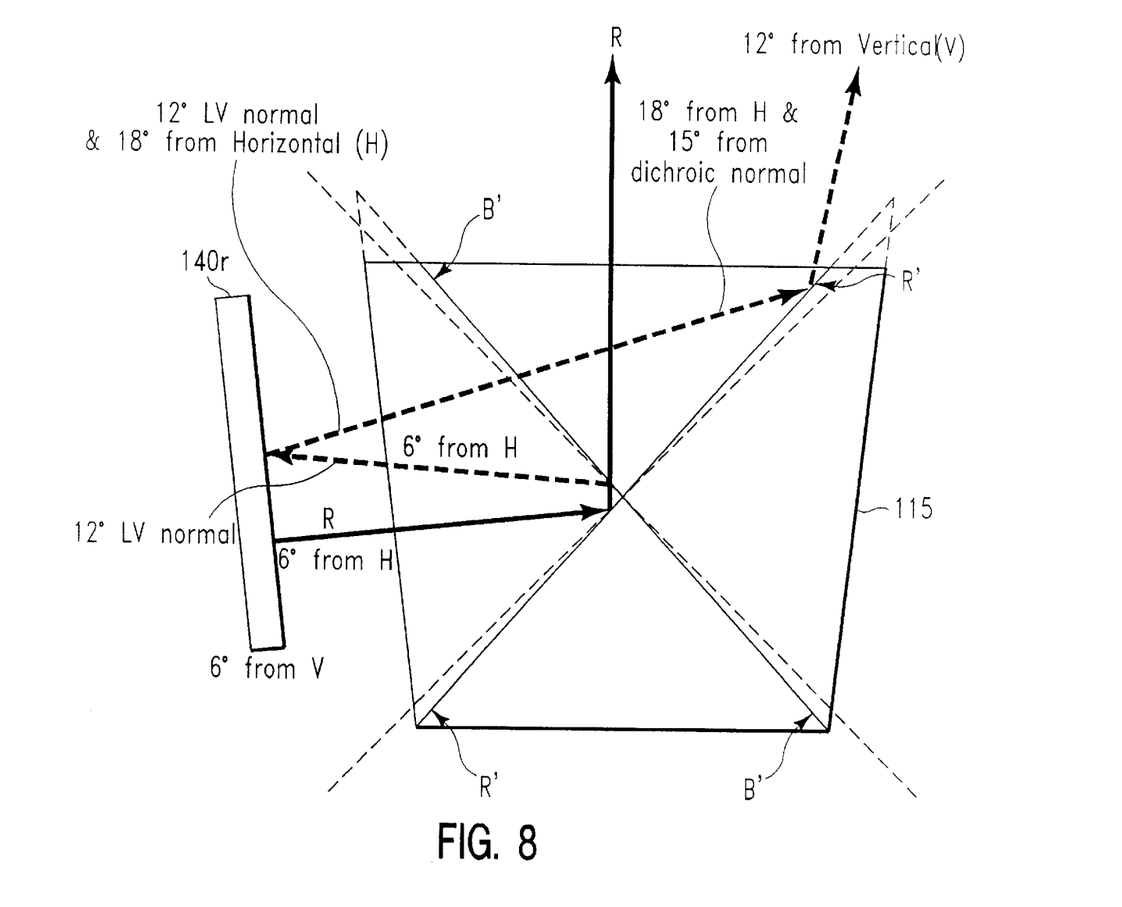
FIG. 8 is an illustration of the stray light path incident on the red dichroic coating for red light using the X-prism arrangement of the present invention.
Figure 9:
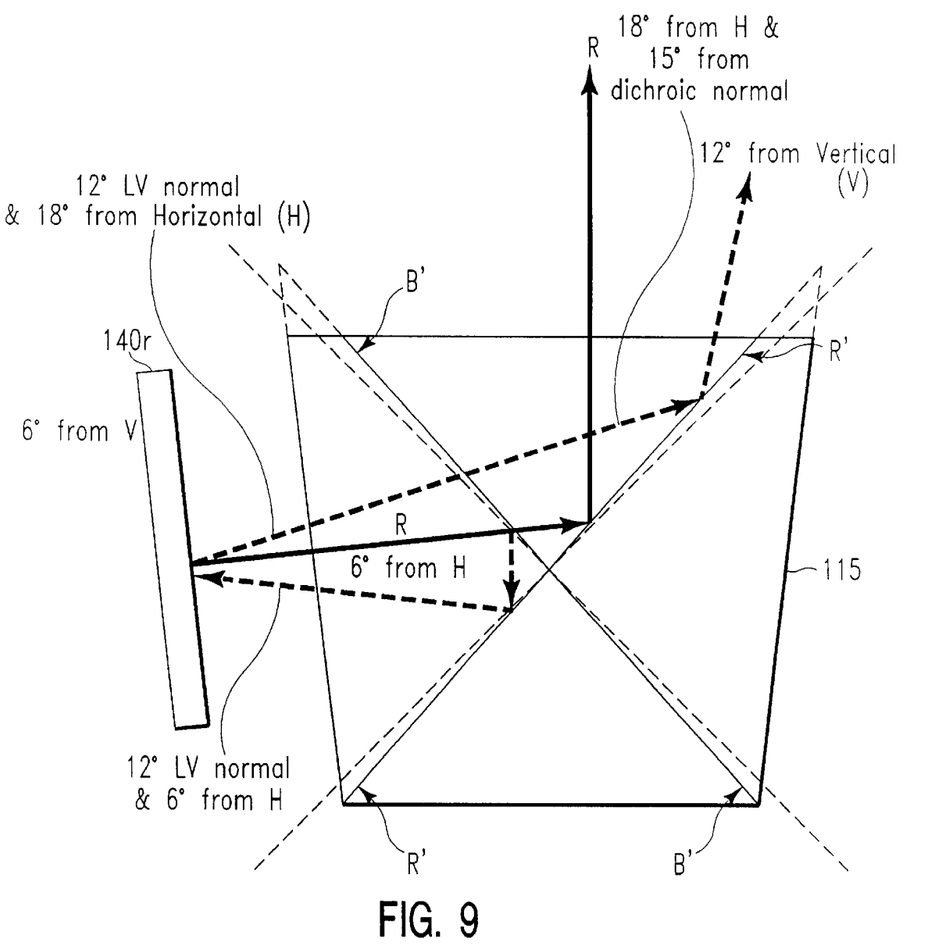
FIG. 9 is an illustration of the stray light path incident on the blue dichroic coating for red light using the X-prism arrangement of the present invention.

FIGS. 8 and 9 illustrate the deviation produced between the wanted rays (solid line) and the unwanted reflections (dashed) achieved by using an inventive X-prism configuration like the type shown in FIG. 6 for the red (side) channel. The other side channel (blue) will exhibit the same angular deviation.

Figure 10:
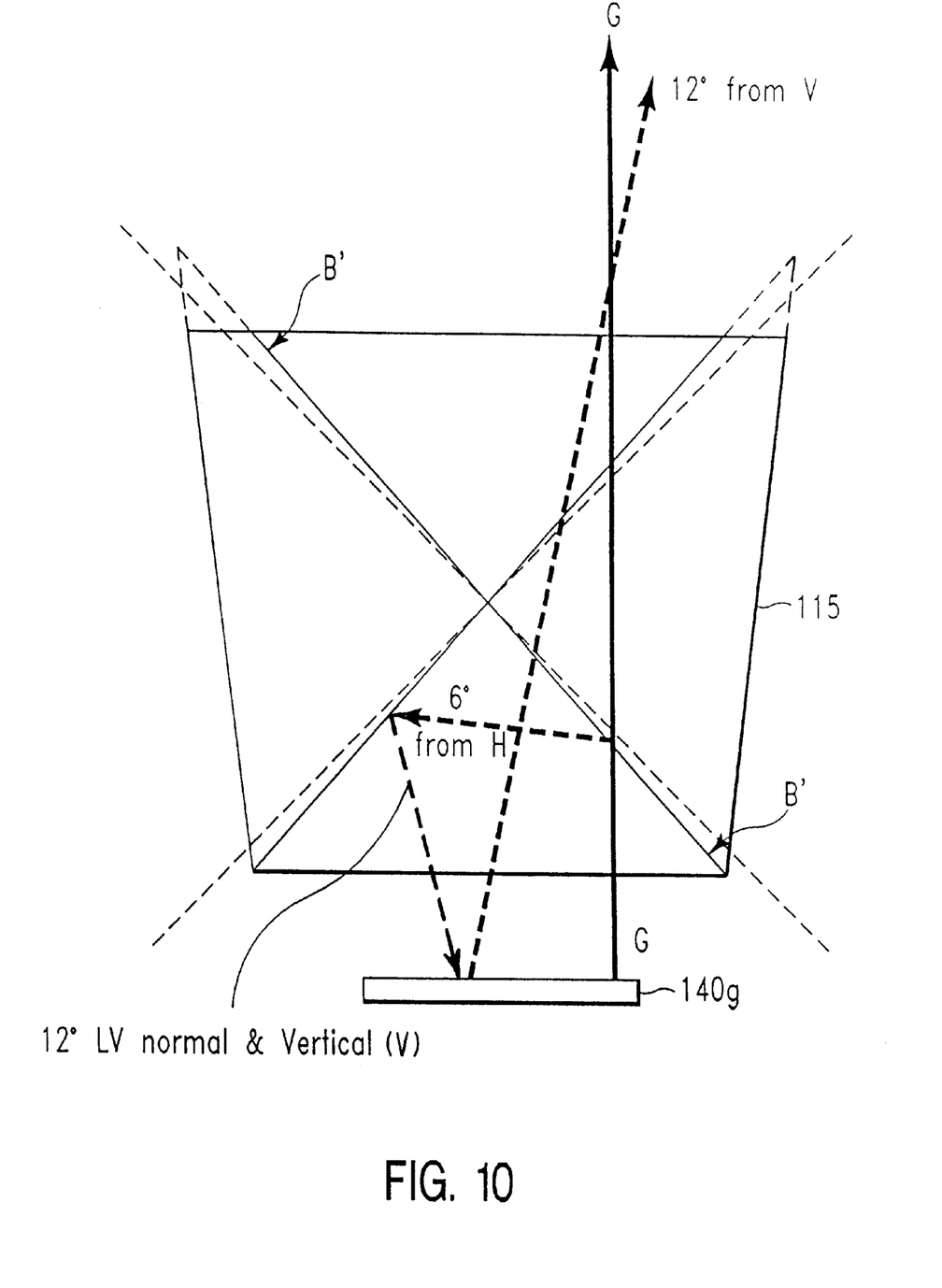
FIG. 10 is an illustration of the stray light path for green light using the X-prism arrangement of the present invention.

Similarly, FIG. 10 depicts the deviation produced between wanted rays (solid) and unwanted (dashed) reflections obtained by using the inventive X-prism arrangement for the straight through (green) channel. It is noted that in FIGS. 8–10, the PBS elements are not shown for simplicity since it does not contribute to the angular deviations illustrated in these figures.

Compared to FIGS. 3(a)–(b) where the spurious reflection is along the same direction as the primary (or common) beam, the spurious reflections depicted in FIGS. 8–10 are 12° away from the primary beam. It is noted that a large departure from a 90° cube is not required to achieve the desired properties. As illustrated above, a tilt of a little as three degrees in each of the two dichromatic surfaces of the prism forming the X-prism produces a 12° deviation in the spurious reflection. Such a deviation is sufficient enough to move the unwanted reflections outside the path of the common beam.

As stated above, the X-prism arrangement of the present invention is capable of significantly reducing glare, ghost images and unwanted reflection while still being able to provide a high resolution image.

While the present invention has particularly shown and described with respect to preferred embodiments thereof, it will be understood by those skilled in the art that the foregoing and other changes in form and detail may be made without departing from the spirit and scope of the present invention.

Having thus described our invention, what we claim as new, and desire to secure by the Letters Patent is:

1. An X-prism for use in optical displays which is capable of recombining red, green and blue light into a common beam for projection, said X-prism comprising four prisms, each prism having a base, an internal angle opposite said base that deviates from 90° and two surfaces adjacent to said base which are coated with different dichroic materials, wherein said four prisms are arranged such that surfaces with like dichroic coatings form two intersecting color specific reflecting planes.

2. The X-prism of claim 1 wherein said reflecting planes are aligned so that the principal ray is incident at an angle other than 45°.

3. The X-prism of claim 2 wherein said reflecting planes are tilted ±3° from a 45° reference orientation.

4. The X-prism of claim 1 wherein said reflecting planes are specific for reflecting one of red, blue or green.

5. The X-prism of claim 1 wherein said internal angle is either 84° or 96°.

6. The X-prism of claim 1 wherein said prisms are triangularly-shaped.

7. A projection system for optical displays comprising
   a lamp source capable of emitting light along a predetermined path;
   a filter for removing ultra-violet or infrared radiation arranged in proximity to said lamp source along said light path;
   illumination optics arranged in proximity to said filter;
   color splitting optics arranged in proximity to said illumination optics, wherein said light from said illumination optics is separated into red, green and blue colored light;
   a light valve optical arrangement in proximity to said color splitting optics;
   a X-prism capable of recombining said red, green and blue colored lights into a common beam, arranged in proximity to said light valve optical arrangement, wherein said X-prism comprises four prisms, each prism having a base, an internal angle opposite said base that deviates from 90° and two surfaces adjacent to said base which are coated with different dichroic materials, wherein said four prisms are arranged such that surfaces with like dichroic coatings form two intersecting color specific reflecting planes;
   a projection lens capable of receiving the common light source and projecting the same; and
   a projection screen for receiving said projected common light source.

8. The projection system of claim 7 wherein said light valve optical arrangement includes three polarizing beam splitters and three light valves.

9. The projection system of claim 8 wherein said light valves are reflective liquid crystal light valves.

10. The projection system of claim 7 wherein said reflecting planes are aligned so that the principal ray is incident at an angle other than 45°.

11. The projection system of claim 10 wherein said reflecting planes are tilted ±3° from a 45° reference orientation.

12. The projection system of claim 7 wherein said reflecting planes are specific for reflecting one of red, blue or green.

13. The projection system of claim 7 wherein said internal angle is either 84° or 96°.

14. The projection system of claim 7 wherein said X-prism substantially deviates unwanted colored light rays away from said common source beam.

15. The projection system of claim 7 wherein said prisms are triangularly-shaped.

* * * * *